Sept. 16, 1969    MASAMI MASUDA    3,467,925
ELECTROMAGNETIC VIBRATION APPARATUS
Filed Nov. 7, 1967    2 Sheets-Sheet 1
FIG.1a
PRIOR ART
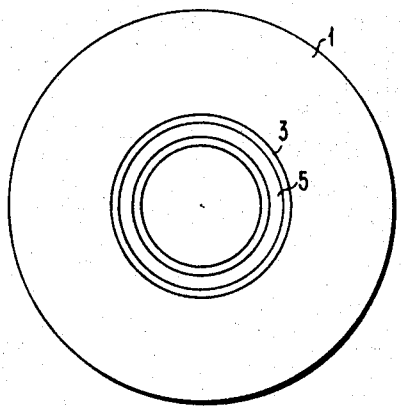
FIG.2a
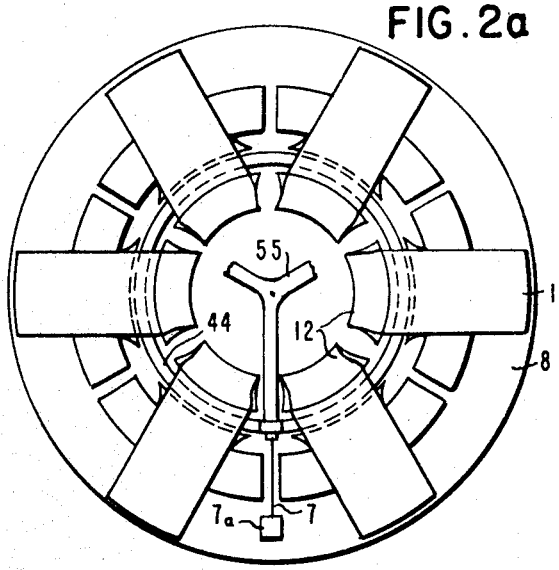
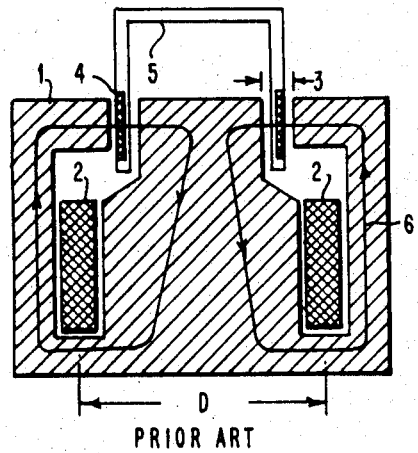
PRIOR ART
FIG.1b
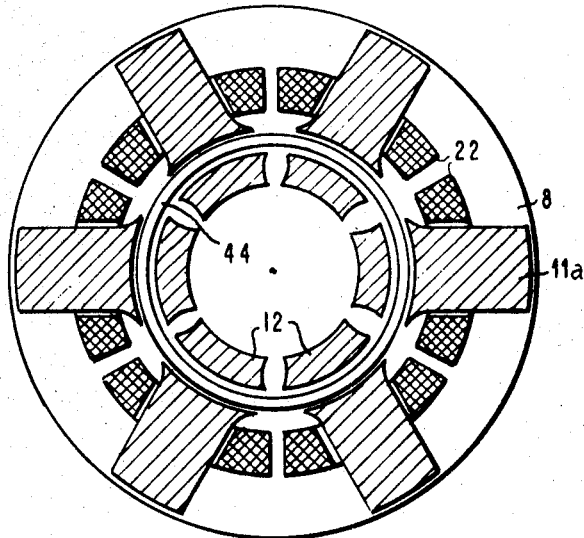
FIG.2c
MASAMI MASUDA
INVENTOR.
BY *Stephen H. Foshay*
ATTORNEY

United States Patent Office 3,467,925
Patented Sept. 16, 1969

3,467,925
ELECTROMAGNETIC VIBRATION APPARATUS
Masami Masuda, Tokyo, Japan, assignor to International Mechanical Vibration Laboratory, Inc., Osaka, Japan, a corporation of Japan
Filed Nov. 7, 1967, Ser. No. 681,279
Claims priority, application Japan, Nov. 30, 1966, 41/78,009
Int. Cl. H01f 7/08; H01k 51/32
U.S. Cl. 335—221           8 Claims

ABSTRACT OF THE DISCLOSURE

A plurality of E-type cores, arranged around the circumference of a circle or polygon and closed off by I-type cores have a circular (or polygonal) coil suspended in the gaps between the center legs of the E and the I-type cores; the cores are energized by a permanent magnet at the back of the E, or coils wound around the center leg of the E, so that a plurality of easily assembled and repaired structures are provided, each having a lesser weight than the entire assembly, and jointly powering the single circular (or polygonal) vibrating coil.

---

Figure 2B:
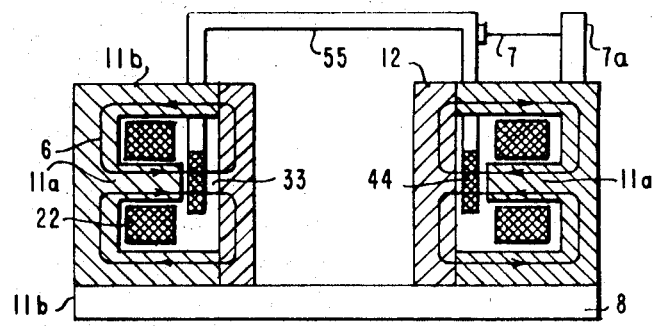

The present invention relates to an electromagnetic vibration apparatus and, more particularly, to an electrical vibration or shaking apparatus for test purposes, and to the construction of magnetic core and coil assemblies for such an apparatus.

Vibration or shaking apparatus using electromagnets usually have a freely movable coil suspended in a high density uniform magnetic field. When alternating current is passed through the suspended coil, the coil will vibrate in synchronism with the frequency of the alternating current. Mechanical coupling to the coil then produces shaking or vibration. The magnetic field is customarily obtained from electro magnets, but may be obtained from permanent magnetic structures.

The drive power F, obtainable from the coil, is mathematically expressed by $$F = kN \cdot I \cdot D \cdot B \qquad (1)$$

where N is the number of turns, I the current, D the diameter of the drive coil and B the density of the magnetic field, or the flux density, and $k$ a dimensionless factor of proportionality.

From the foregoing formula it is apparent that, to obtain a large drive power it is necessary either to make the ampere turns (NI) large, or to make the diameter of the coil D, or the flux density B large. However, when the ampere turns are made large, the gap of the magnetic field also becomes large. There is a limit governed by material limitations, that is, the saturation flux which the iron core can carry. It is thus necessary to adopt a large diameter and a large flux density—again, to a certain extent limited by the materials available. Increasing the drive power by increasing any one of the factors in Formula 1 above thus causes substantial increase in the structure, the weight, and thus increases the complexity and difficulty of construction and repair.

It is an object of the present invention to provide electromagnetic vibration apparatus which is easily assembled, is readily repairable, and does not require the use of heavy integral metallic structures.

Subject matter of the present invention

Briefly, a plurality of core assemblies are provided arranged as upstanding E-type cores. An I-type core is placed against the open end of the E-type core to form a closed magnetic circuit between the outer arms of the E. An air gap is left between the center arm of the E-type core and facing the I-type core. The coil is suspended in this air gap, the coil linking the plurality of all the cores. A magnetic field is generated to traverse the air gap, either by placing an electro-magnetic coil on the E-type core, or providing permanent magnets as the back for the E-type core. Thus, large drive power can be obtained because the saturation flux density of the entire assembly, with respect to its entire weight, will be greater than when a single unit is provided; further, each one of the E-type cores are readily dis-assembled from the I-type core for maintenance or repair of either the vibration coil or the cores themselves.

Figure 3:
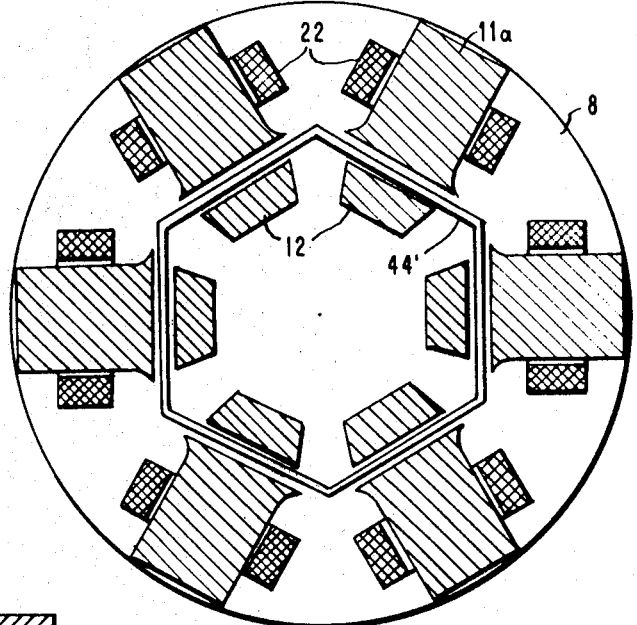
Figure 4:
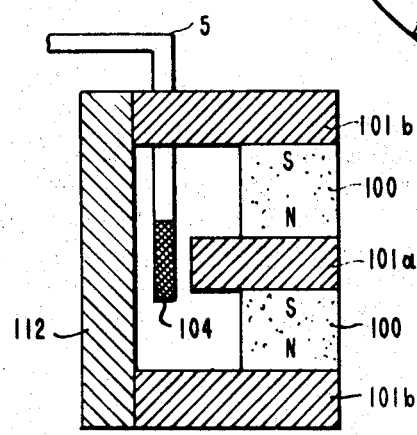

The structure, organization, and operation of the invention will now be described more specifically with reference to the accompanying drawings, wherein:

FIGURES 1a and 1b are diagrammatic views of the construction of a vibration or shaking system customary in the prior art, FIGURE 1a being a top view and FIGURE 1b being a cross-sectional view;

FIGURES 2a-c are diagrammatic views illustrating the construction of an embodiment of this invention, FIGURE 2a being a top view, FIGURE 2b being a horizontal sectional view and FIGURE 2c being a vertical sectional view of two core elements, only;

FIGURE 3 is a view similar to FIGURE 2c illustrating a different embodiment of the present invention; and FIGURE 4 is a view similar to FIGURE 2a illustrating another embodiment of the present invention.

Referring now to the drawings, and particularly to FIGURE 1, which illustrates the prior art: a magnetic field structure 1, formed of ferrous material provides a magnetic circuit, the flux lines of which are indicated at 6 in FIGURE 2. A bias coil 2 (FIGURE 1b) is located in the core 1 to provide magnetic flux across the air gap 3 within which a drive coil 4, supplied by alternating current, is suspended by a suitable structure not shown. Coil 4 is wound on a coil form 5, connected to the test platform or apparatus to be vibrated.

If direct current is passed through the bias, or exciting coil 2, the flux shown by line 6 (FIGURE 1b) will be generated. If the drive power needed is large, it has been necessary to either make the flux density great or to substantially increase the diameter of the coil 2. However, material limitations, that is, the saturation density of ferrous materials limits the flux density to a value of between 15 and 16 kilogauss per square centimeter; still larger drive power can be obtained only by further increase of the diameter D. Increasing the diameter of coil 2, however, results in a very large electromagnetic structure of such a weight that the value of the apparatus to the user may be impaired, resulting further in great difficulties in manfacture, transportation, and assembly and erection, and further in combination with other devices or test apparatus.

The separate subviews of FIGURE 2, illustrate the solution to the problem in accordance with the present invention. Several magnetic blocks are arranged in an endless geometric configuration, such as along the circumference of a circle, a triangle, a square or other polygon. These cores are mounted on a base 8. Each one of the cores has an E-type core having a center leg 11a which is shorter than the end legs 11b. An I-type core 12, in order to increase the efficiency of the magnetic circuit, is mounted against the end legs 11b of the E-type core. The magnetic exciting coil 22 is wound around the center leg 11a of the E-type core 11. The drive coil 44 is suspended in the gap between the shorter center leg 11a of the E-type core 11 and the I-type core 12. Again, it is wound on a coil form 55, to which the material to be vibrated is attached. The coil form itself is supended by a suspension system illustrated by a spring wire 7 secured to a block 7a and attached to the E-type core as best seen in FIGURE 2b. Only one such suspension system is shown for clarity, it being assumed that three, or six such suspension systems and coil form arms can be provided for an assembly arranged around a hexagon. The coil 44 itself, when supplied with alternating current, for example, through a pair of suspension springs 7, will vibrate in the air gap 33. By comparison (a structure of the prior art is illustrated in the FIGURES 1a and 1b) a saving in weight in copper wire of several tens of percents and similar saving in drive power is obtainable. By using an E-type and an I-type magnetic core structure, no unnecessary space need be filled with ferrous material and the weight efficiency is high. Additionally, each core unit can be assembled separately on the base 8, can be removed individually for repair or maintenance, and thus shipment of single heavy structures can be avoided.

The structure of FIGURE 3 is similar to that of FIGURE 2, except that the drive coil 44' is polygonal. This has the additional advantage that the air gap in which the drive coil vibrates will be straight—thus making the assembly of the entire vibrating structure easier.

As seen in FIGURE 3, the ends of the pole pieces can be slightly flared.

FIGURES 2a-c and 3 illustrate a vibration apparatus utilizing electric current to obtain a magnetic field.

FIGURE 4 illustrates an embodiment in which a magnetc field is obtained, again in E-type core, but by permanent magnets. Only a single core unit is shown, it being understood that similar units can be arranged as illustrated in FIGURE 2a or in FIGURE 3. Permanent magnets 100 are located between core or pole elements. The E-type core is thus formed of the center leg 101a of ferrous material, the other legs 101b, likewise of ferrous material, and the magnets 100 poled as shown. The I-type core 112 closes the magnetic circuit. Coil 104, again suspended on a coil form 5, can then vibrate in the gap as before, when supplied with alternating electrical current.

The number and the arrangement of the magnetic blocks can be selected according to the drive power required. Since each unit has its own magnetic exciting coil (or permanent magnetic structure) each one of the coils or magnetic structure can be much smaller, further simplifying transportation and installation. As an additional advantage, the entire assembly can easily be enclosed, protecting the apparatus from dirt and moisture.

The present invention has been illustrated in connection with a vibration apparatus in which the cores are arranged in a closed or endless geometric configuration; it is also possible to arrange the cores side by side, or opposite each other, or back to back; similarly, the position of the E-type core and the I-type core with respect to the center of the endless geometrical configuration can be reversed.

I claim:
1. Electromagnetic vibration apparatus comprising a base;
   a plurality of core assemblies mounted on said base, each core assembly having an upstanding E-type core and an I-type core, assembled to form a closed magnetic circuit between the outer arms of the E and the I, and an air gap opposite the center arm of the E adjacent the I;
   means generating a magnetic field traversing said air gap of each core assembly; and
   a single coil suspended in said air gaps of all said core assemblies.

2. Apparatus as claimed in claim 1, wherein said magnetic field generating means includes a plurality of electromagnetic coils, one each wound on the center arm of the E of a respective core and energized by direct current.

3. Apparatus as claimed in claim 1, wherein said magnetic field generating means includes a plurality of permanent magnets located at the upstanding back of the E.

4. Apparatus as claimed in claim 1, wherein said plurality of core assemblies are arranged on the base along an endless geometric configuration.

5. Apparatus as claimed in claim 4, wherein said core assemblies are arranged on the base along the circumference of a circle.

6. Apparatus as claimed in claim 4, wherein said core assemblies are arranged on the base along the circumference of a polygon.

7. Apparatus as claimed in claim 4, wherein at least six core assemblies are provided, and said core assemblies are arranged along the circumference of a hexagon.

8. Apparatus as claimed in claim 4 including mounting points equidistantly spaced around the circumference of said endless geometric configuration and extending upwardly from said core assembly; and means interconnecting said mounting points and said single coil to suspend said coil in said air gap while permitting longitudinal motion thereof with respect to said core assemblies.

References Cited

UNITED STATES PATENTS

| 3,123,728 | 3/1964 | Kreiskorte | 310—27 XR |
| 3,139,545 | 6/1964 | Dreyfus | 310—27 |
| 3,234,782 | 2/1966 | Grootenhuis | 310—27 XR |

G. HARRIS, Primary Examiner

U.S. Cl. X.R.
310—27; 335—222